United States Patent [19]

Primeaux, II et al.

[11] Patent Number: 5,124,426
[45] Date of Patent: Jun. 23, 1992

[54] SPRAYABLE POLYUREA ELASTOMER MADE FROM REACTION OF ISOCYANATE COMPOUND WITH AMINE TERMINATED POLYETHER AND DI(METHYLTHIO)TOLUENE DIAMINE AND DIETHYLTOLUENE DIAMINE CHAIN EXTENDERS

[75] Inventors: Dudley J. Primeaux, II, Elgin; Robert A. Grigsby, Jr., Georgetown; Doris M. Rice, Austin, all of Tex.

[73] Assignee: Texaco Chemical Company, White Plains, N.Y.

[21] Appl. No.: 412,373

[22] Filed: Sep. 26, 1989

[51] Int. Cl.$^5$ ............................................. C08G 18/65
[52] U.S. Cl. ....................................... 528/60; 528/64; 528/68; 528/76; 528/77
[58] Field of Search ...................... 528/60, 64, 68, 77, 528/76

[56] References Cited

U.S. PATENT DOCUMENTS 4,631,298  12/1986  Presswood ............................ 528/76

*Primary Examiner*—Maurice J. Welsh
*Assistant Examiner*—Rachel Johnson
*Attorney, Agent, or Firm*—Robert A. Kulason; James J. O'Loughlin; Dominick G. Vicari

[57] ABSTRACT

A pourable and/or sprayable polyurea elastomer is disclosed. The elastomer includes an isocyanate, an amine terminated polyoxyalkylene polyol, and a chain extender. The isocyanate is preferably a quasi-prepolymer of an isocyanate and a material selected from at least one polyol, a high molecular weight polyoxyalkyleneamine or a combination thereof. The chain extender includes at least di(methylthio)-toluene diamine. A method for improving the flowability of a polyurea elastomer, thereby permitting the elastomer to be sprayed or, optionally, poured, is also disclosed.

17 Claims, No Drawings

SPRAYABLE POLYUREA ELASTOMER MADE FROM REACTION OF ISOCYANATE COMPOUND WITH AMINE TERMINATED POLYETHER AND DI(METHYLTHIO)TOLUENE DIAMINE AND DIETHYLTOLUENE DIAMINE CHAIN EXTENDERS

BACKGROUND OF THE INVENTION

1. Field of the Invention

The present invention relates to sprayable and pourable polyurea elastomers which include novel chain extenders.

2. Description of Background Art

Elastomer systems are commonly recognized as, among other things, coating materials, with spray polyurea elastomer systems being particularly useful when employed in this capacity. One of the considerations confronting the skilled artisan is the sprayability of the elastomer during the critical period, that is, the point at which the reactive components are combined up through the point at which gelation occurs. Similarly, the pourability of the elastomer during the critical period also concerns the skilled artisan where the elastomer is to be poured into an open mold, such as in electric potting type work.

Polyurea elastomer systems are generally prepared by reacting an isocyanate with an active hydrogen component in the presence of a chain extender. Certain known chain extenders react very rapidly with the isocyanate component and, therefore, are not well suited for spray or pour systems, inasmuch as polymerization or gelation occurs so rapidly that the elastomer is virtually unsprayable and unpourable. One of the most widely employed chain extenders is diethyltoluene diamine (DETDA), a product of Ethyl Corporation. Polyurea elastomer systems fabricated from, among other things, DETDA generally exhibit good processing characteristics. However, one of the shortcomings associated with elastomer systems fabricated with DETDA, where sprayability and/or pourability are at issue, is the rapid gelation time. The polyurea elastomer system of the present invention includes a chain extender that reacts slower with the isocyanate component and, accordingly, the rate at which the elastomer will gel is reduced resulting in improved flowability, thereby permitting the elastomer to be sprayed and/or poured. In addition, the polyurea elastomer system of the present invention exhibits certain properties which are similar to or better than those exhibited by systems fabricated from DETDA.

U.S. Pat. No. 3,979,364 describes the use of aminated polyethers as hereinafter used as a component with a polyol to make an elastomer. U.S. Pat. No. 3,666,788 describes the use of cyanoalkylated aminated polyethers in spray systems. The '788 disclosure, in Column 1, states that the aminated polyethers as used hereinafter cannot be used in spray coatings due to very rapid reaction rates with isocyanates.

U.S. Pat. Nos. 4,379,729; 4,444,910 and 4,433,067 describe elastomers which are prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, such as catalysts and fillers, including glass fibers. For example, see U.S. Pat. No. 4,607,090.

U.S. Pat. No. 3,714,128 describes cyanoalkylated polyoxyalkylene polyamines which are useful for slowing the gelling or hardening of the polyurea component so that good mixing of the isocyanate and amine components can be attained, which gives the sprayed material ample time to adhere and level before gelation of the polyurea coating occurs. This patent does not describe the particular chain extenders employed in the elastomer of the present invention.

U.S. Pat. No. 4,714,778 describes certain alkenylated toluene diamines which are reported as being useful as tri- and tetrafunctional chain extenders for forming polyurethane-urea elastomers.

U.S. Pat. No. 4,816,543 describes a monotertiaryalkyltoluene diamine which is reported as being useful as a chain extending agent for the formation of polyurethane-urea elastomers. At least 50% of the equivalent weight of the chain extending agent is mono-tertiarybutyltoluene diamine.

U.S. Pat. No. 4,806,615 describes reaction injection molded (RIM) elastomers consisting of a cured reaction product of primary or secondary amine terminated polyethers of greater than 1500 molecular weight, an aromatic polyisocyanate, a combination of an unsubstituted aromatic diamine chain extender and a substituted acyclic aliphatic diamine chain extender.

U.S. Pat. No. 4,218,543 describes the use of high molecular weight polyols, certain aromatic diamines and isocyanates for the production of RIM parts. This patent specifically claims as a chain extender 1-methyl-3,5-diethyl-2,4-diaminobenzene (diethyltoluenediamine) and its isomer.

U.S. Pat. No. 4,523,004 discloses a substituted aromatic diamine chain extender in a RIM product.

U.S. Pat. No. 4,631,298 discloses blending various slower reacting chain extenders with diethyltoluene diamine in a RIM system using amine terminated polyethers.

Thus, it is our understanding that a polyurea elastomer system which incorporates the particular chain extenders described hereinbelow and which is sprayable and/or pourable has heretofore been unavailable.

SUMMARY OF THE INVENTION

Accordingly, the present invention relates to a polyurea elastomer which comprises an (A) component and a (B) component. The (A) component includes an isocyanate. Preferably, the isocyanate of component (A) includes a quasi-prepolymer of an isocyanate and a material selected from at least one polyol, a high molecular weight polyoxyalkyleneamine or a combination of these materials. The (B) component includes (1) an amine terminated polyoxyalkylene polyol and (2) a chain extender which includes at least di(methylthio)-toluene diamine. Preferably, the chain extender includes a combination of di(methylthio)-toluene diamine and diethyltoluene diamine (DETDA).

The present invention also relates to a method for improving the flowability of a polyurea elastomer thereby permitting said elastomer to be sprayed or, optionally, poured. Specifically, the present method comprises incorporating a chain extender including at least di(methylthio)-toluene diamine into the elastomer. The di(methylthio)-toluene diamine is employed in an amount sufficient to reduce the time in which the elastomer will gel, thereby improving the flowability of the elastomer. A first and second reactive stream are directed into mutual contact with each other to effectuate a mixing of the first and second reactive streams. The first reactive stream includes an isocyanate and the second reactive stream includes an amine terminated polyoxyalkylene polyol and the aforedescribed chain extender. The mixed first and second reactive streams are sprayed or, optionally, poured onto or, optionally, into a substrate.

Advantageously, when the chain extenders disclosed herein are used to prepare the elastomer of the present invention, the rate at which gelation will occur is reduced resulting in improved flowability, thereby permitting the elastomer to be sprayed during the aforestated critical period. The reduced reactivity and resulting improved flowability also permits the present elastomer to be used in a pour gun for electrical potting work and small mold filling work. In addition to satisfying the criteria of sprayability and/or pourability, the present elastomer also exhibits improved elongation and spray surface quality, as well as good processability, appearance and toughness.

DESCRIPTION OF THE PREFERRED EMBODIMENTS

The isocyanates employed in component (A) are those known to one skilled in the art. Thus, for instance, they can include aliphatic isocyanates of the type described in U.S. Pat. No. 4,748,192. Accordingly, they are typically aliphatic diisocyanates, and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Cyclohexane diisocyanate is also to be considered a preferred aliphatic isocyanate. Other useful aliphatic polyisocyanates are described in U.S. Pat. No. 4,705,814. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl-5-isocyanatomethyl-cyclohexane (isophorone diisocyanate); 4,4'-,2,2'- and 2,4'-dicyclohexyl-methane diisocyanate as well as the corresponding isomer mixtures, and the like.

A wide variety of aromatic polyisocyanates may be used to form the elastomer of the present invention. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isooyanatophenyl)methane, bis(3-methyl-3-isocyanatophenyl)methane, bis(3-methyl-4-isocyanatophenyl)-methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent diphenyldiisocyanate isomers, of which 20 to about 95 weight percent thereof is the 4,4'-isomer with the remainder being polymethylene polyphenyl polisocyanates of higher molecular weight and funtionality that have an average functionality of from about 2.1 to about 3.5. These isocyanate mixtures are known, commercially available materials and can be prepared by the process described in U.S. Patent No. 3,362,979.

By far the most preferred aromatic polyisocyanate is methylene bis(4-phenylisocyanate) or MDI. Pure MDI, quasiprepolymers of MDI, modified pure MDI, etc. are useful. Materials of this type may be used to prepare suitable RIM elastomers. Since pure MDI is a solid and, thus, often inconvenient to use, liquid products based on MDI or methylene bis(4-phenylisocyanate) are used herein. U.S. Pat. No. 3,394,164 describes a liquid MDI product. More generally, uretonimine modified pure MDI is included also. This product is made by heating pure distilled MDI in the presence of a catalyst. The liquid product is a mixture of pure MDI and modified MDI and is represented as follows:

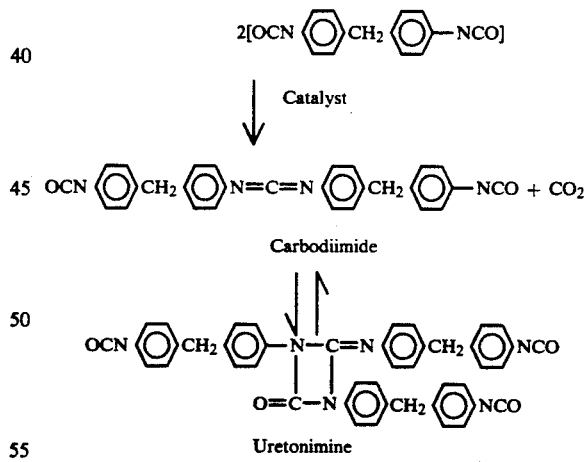

Examples of commercial materials of this type are Dow's ISONATE® 125M (pure MDI) and ISONATE 143L ("liquid" MDI). Preferably the amount of isocyanates used is the stoichiometric amount based on all the ingredients in the formulation or greater than the stoichiometric amount.

Of course, the term isocyanate also includes quasi-prepolymers of isocyanates or polyisocyanates with active hydrogen containing materials. The active hydrogen containing materials can include, but are not limited to, a polyol or polyols, a high molecular weight polyoxyalkyleneamine or combinations thereof.

The polyols include polyether polyols, polyester diols, triols, tetrols, etc., having an equivalent weight of at least about 500, and preferably at least about 1,000 up to about 3,000. Those polyether polyols based on trihydric initiators of about 4,000 molecular weight and above are especially preferred. The polyethers may be prepared from ethylene oxide, propylene oxide, butylene oxide or mixtures of propylene oxide, butylene oxide and/or ethylene oxide. Other high molecular weight polyols which may be useful in this invention are polyesters of hydroxyl terminated rubbers, e.g., hydroxyl terminated polybutadiene. Hydroxyl terminated quasiprepolymers of polyols and isocyanates are also useful in this invention.

Especially preferred are amine terminated polyether polyols, including primary and secondary amine terminated polyether polyols of greater than 1,500 average molecular weight having from about 2 to about 6 functionality, preferably from about 2 to about 3, and an amine equivalent weight of from about 750 to about 4,000. Mixtures of amine terminated polyethers may be used. In a preferred embodiment the amine terminated polyethers have an average molecular weight of at least about 2,500. These materials may be made by various methods known in the art.

The amine terminated polyether resins useful in this invention, for example, are polyether resins made from an appropriate initiator to which lower alkylene oxides, such as ethylene oxide, propylene oxide, butylene oxide or mixtures thereof, are added with the resulting hydroxyl terminated polyol then being aminated.

When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxy groups. However, the majority of hydroxyl groups are replaced by amine groups. Therefore, in a preferred embodiment, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by known techniques, for example, as described in U.S. Pat. No. 3,654,370, the contents of which is incorporated herein by reference.

In the practice of this invention, a single high molecular weight amine terminated polyol may be used. Also, mixtures of high molecular weight amine terminated polyols, such as mixtures of di-and trifunctional materials and/or different molecular weight or different chemical composition materials, may be used.

Also, high molecular weight amine terminated polyethers or simply polyether amines are included within the scope of our invention and may be used alone or in combination with the aforestated polyols. The term high molecular weight is intended to include polyether amines having a molecular weight of at least about 2000. Particularly preferred are the JEFFAMINE ® series of polyether amines available from Texaco Chemical Company; they include JEFFAMINE D-2000, JEFFAMINE D-4000, JEFFAMINE T-3000 and JEFFAMINE T-5000. These polyether amines are described with particularity in Texaco Chemical Company's product brochure entitled THE JEFFAMINE POLYOXYALKYLENEAMINES.

The (B) component of the present polyurea elastomer system includes an amine terminated polyoxyalkylene polyol and a chain extender. The amine terminated polyoxyalkylene polyol is preferably selected from diols or triols and, most preferably, includes a blend of diols and/or triols. The particular polyols, i.e., diols and/or triols, employed in component (B) are the same as those described hereinabove in connection with the quasi-prepolymer of component (A).

The chain extenders useful in this invention include di(methylthio)-toluene diamine, either used alone or, in a preferred embodiment, in combination with, 1-methyl-3,5-diethyl-2,4-diaminobenzene or 1-methyl-3,5-diethyl-2,6-diaminobenzene (both of these materials are also called diethyltoluene diamine or DETDA).

The aforestated combination includes from about 20 to about 99 parts of di(methylthio)-toluene diamine to about 80 to about 1 parts of DETDA.

One particularly preferred form of the di(methylthio)-toluene diamine component of the chain extender is as Ethacure ® 300, a product of Ethyl Corporation. Specifically, Ethacure 300 is a 4:1 blend of 3,5-di(methylthio)-2,4-toluene diamine and 3,5 di(methylthio)-2,6-toluene diamine, respectively.

Advantageously, the (A) and (B) components react to form the present elastomer system without the aid of a catalyst. However, if desired, a catalyst can be used.

Catalysts such as tertiary amines or an organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine); heterocyclic amines, such as N-alkymorpholines (e.g., N-methylmorpholine, N-ethylmorpholine, dimethyldiaminodiethylether, etc.), 1,4-dimethylpiperazine, triethylenediamine, etc.; and aliphatic polyamines, such as N,N,N'N' tetramethyl-1,3-butanediamine.

Other conventional fomulation ingredients may be employed in component (A) or (B) as needed, such as, for example, foam stabilizers, also known as silicone oils or emulsifiers. The foam stabilizers may be an organic silane or siloxane. For example, compounds may be used having the formula:

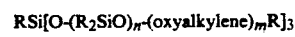

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Pigments, for example titanium dioxide, may be incorporated in the elastomer system, preferably in the (B) component, to impart color properties to the elastomer.

Post curing of the elastomer of the invention is optional. Post curing will improve some elastomeric properties, such as heat sag. Employment of post curing depends on the desired properties of the end product.

The (A) component and (B) component of the present polyurea elastomer system are combined or mixed under high pressure; most preferably, they are impingement mixed directly in the high pressure equipment, which is, for example, a GUSMER® H-V proportioner fitted, for instance, with a GUSMER Model GX-7 spray gun. In particular, a first and second pressurized stream of components (A) and (B), respectively, are delivered from two separate chambers of the proportioner and are impacted or impinged upon each other at high velocity to effectuate an intimate mixing of the two components and, thus, the formation of the elastomer system, which is then coated onto the desired substrate via the spray gun.

As stated above, the polyurea elastomer of the present invention can also be used in a pour gun for electric potting type work or other open mold work that involves pouring. When used in this capacity, the (A) and (B) components are mixed in the same manner as described above. However, the high pressure spray equipment is fitted with a pour gun, such as a GUSMER model AR-C pour gun, instead of a spray gun.

Whether the elastomer of the present invention is to be sprayed or poured, the volumetric ratio of the (A) component to the (B) component is generally from about 30 to 70 percent to about 70 to 30 percent. Preferably, component (A) and component (B) are employed in a 1:1 volumetric ratio.

GLOSSARY OF TERMS AND MATERIALS

ISONATE® 143 L—Carbodiimide modified liquid MDI; a product of the Dow Chemical Company.

THANOL® SF-5505—A 5500 molecular weight polyether triol containing approximately 80% primary hydroxide groups; a product of ARCO Chemical Company.

ETHACURE® 300—a 4:1 blend of 3,5-di(methylthio)-2,4-toluene diamine and 3,5-di(methylthio)-2,6-toluene diamine; a product of Ethyl Corporation.

JEFFAMINE® T-5000—Polypropylene oxide triamine of about 5000 molecular weight; a product of Texaco Chemical Company.

JEFFAMINE® T-3000—Polypropylene oxide triamine of about 3000 molecular weight; a product of Texaco Chemical Company.

JEFFAMINE® D-4000—Polypropylene oxide diamine of about 4000 molecular weight; a product of Texaco Chemical Company.

JEFFAMINE® D-2000—Polypropylene oxide diamine of about 2000 molecular weight; a product of Texaco Chemical Company.

The following examples are provided to further illustrate preferred embodiments of the present invention and should not be construed as limiting the present invention in any way.

In the examples, all spray work was performed with a GUSMER H-V high pressure proportioner fitted with a GUSMER model GX-7 spray gun or a GUSMER model AR-C pour gun, where appropriate. The elastomer systems were sprayed and poured using a block temperature of 160° F. on the (A) component side and 150° F. to 160° F. on the (B) component side, with a hose temperature of 160° F. The system output ranged from 17.5 lbs/min to 22.5 lbs/min with a line pressure ranging from 1400 to 2800 psig on the (A) component side and (B) component side. Each of the elastomer systems produced in the examples were mixed at an (A):(B) volumetric ratio of 1:1.

EXAMPLE I

The (A) component of a polyurea elastomer was prepared by combining 60 parts of ISONATE 143L and 40 parts of THANOL SF-5505 to form a quasi-prepolymer. The (B) component was prepared by combining 63.75 parts of JEFFAMINE D-4000, 25.0 parts of DETDA and 11.25 parts of Ethacure 300. The (A) and (B) components were mixed in the high pressure equipment, which was fitted with a pour gun. The resulting elastomer was poured into and filled a 10"×10"×0.125" plaque mold.

COMPARATIVE EXAMPLE I (A)

The (A) component of the polyurea elastomer produced in this example was prepared in accordance with Example I. The (B) component was prepared by combining 65.8 parts of JEFFAMINE D-4000 with 34.2 parts of DETDA. The (A) and (B) components were mixed in the high pressure equipment, which was fitted with a pour gun. The resulting elastomer was poured into and partially filled (85%) a 10"×10"×0.125" plaque mold.

The physical properties of the polyurea elastomers produced in Example I and Comparative Example I(A) were analyzed; the results as well at the respective gel times are reported in Table I.

TABLE I

| PROPERTIES | EXAMPLE I | COMPARATIVE EXAMPLE I(A) |
| --- | --- | --- |
| Gel Time (sec.) | 2.6 | 1.5 |
| Tensile (psi) | 2785 | 3402 |
| Elongation (%) | 290 | 280 |
| Tear (pli) | 621 | 639 |
| Shore D hardness | | |
| (0 sec.) | 62 | 66 |
| (10 sec.) | 57 | 60 |
| Flexural Modulus (psi) (77° F.) | 69233 | 63679 |

As these data demonstrate, the polyurea elastomer of the present invention (Example I) exhibits a gel time that is far slower than that exhibited by an elastomer which is devoid of the chain extenders described herein (Comparative Example I(A)). The elastomer produced in Comparative Example I(A) was pourable; however, the flowability was noticeably inferior to that exhibited by the elastomer of Example I. Additional properties, such as elongation and flexural modulus, are also improved.

EXAMPLE II

The (A) component of the polyurea elastomer produced in this example was prepared in accordance with Example I. The (B) component was prepared by combining 64.0 parts of JEFFAMINE T-5000, 26.9 parts of DETDA and 9.1 parts of Ethacure 300. The (A) and (B) components were mixed in the high pressure equipment, which was fitted with a model GX-7 spray gun. The resulting elastomer was sprayed onto a flat metal substrate coated with a zinc stearate based external mold release agent.

COMPARATIVE EXAMPLE II(A)

The (A) component of the polyurea elastomer produced in this example was prepared in accordance with Example I. The (B) component was prepared by combining 66.0 parts of JEFFAMINE T-5000 and 34.0 parts of DETDA. The resulting elastomer was sprayed onto the substrate as in Example II.

The physical properties of the polyurea elastomers produced in Example II and Comparative Example II(A) were analyzed; the results as well as the respective gel times are reported in Table II.

TABLE II

| PROPERTIES | EXAMPLE II | COMPARATIVE EXAMPLE II(A) |
|---|---|---|
| Gel Time (sec.) | 2.5 | 1.5 |
| Tensile (psi) | 1872 | 1918 |
| Elongation (%) | 130 | 117 |
| Tear (pli) | 424 | 403 |
| Shore D hardness | | |
| (0 sec.) | 53 | 50 |
| (10 sec.) | 49 | 47 |
| Flexural Modulus (psi) | | |
| (77° F.) | 43693 | 42900 |
| (158° F.) | 33861 | 36822 |
| (−20° F.) | 84848 | 83241 |
| Heat sag (mm) | | |
| 100 mm - 250° F./60 min | 1.0 | 0.25 |
| 150 mm - 250° F./60 min | 4.0 | 1.9 |

These data further establish the reduced gel time exhibited by the polyurea elastomer of the present invention. Again, these data establish the superiority of certain other properties. It is also noted that upon visual inspection of the elastomers produced in Example II and Comparative Example II(A), the elastomer of the present invention exhibited a smoother surface, indicating improved flowability, than the elastomer produced in Comparative Example II(A).

EXAMPLE III

The (A) component of the polyurea elastomer produced in this example was prepared in accordance with Example I. The (B) component was prepared by combining 63.2 parts of JEFFAMINE D-4000, 21.6 parts of DETDA and 15.2 parts of Ethacure 3000. The (A) and (B) components were mixed in the high pressure equipment and were sprayed onto the substrate as in Example II and Comparative Example II(A).

The physical properties of the polyurea elastomer produced in Example III were analyzed; the results as well as the gel time are reported in Table III.

TABLE III

| PROPERTIES | EXAMPLE III |
|---|---|
| Gel Time (sec.) | 2.5 |
| Tensile (psi) | 1976 |
| Elongation (%) | 190 |
| Tear (pli) | 459 |
| Shore D hardness (0 sec/10 sec.) | 56/49 |
| Flexural Modulus (psi) | |
| (77° F.) | 35142 |
| (158° F.) | 24772 |
| (−20° F.) | 91988 |
| Heat sag (mm) | |
| 100 mm - 250° F./60 min | 11.1 |
| 100 mm - 311° F./60 min | 38.1 |
| 150 mm - 250° F./60 min | 20.4 |
| 150 mm - 311° F./60 min | complete sag |

What is claimed is:

1. A sprayable polyurea elastomer comprising an (A) component which includes an isocyanate and a (B) component which includes (1) an amine terminated polyoxyalkylene polyol and (2) a chain extender, said chain extender including a blend of di(methylthio)-toluene diamine and diethyltoluene diamine, said chain extender including between 71 and about 80 wt.% diethyltoluene diamine based upon the total weight of said chain extender.

2. The elastomer of claim 1 wherein said isocyanate of component (A) comprises a quasi-prepolymer of said isocyanate and a material selected from at least one polyol, a high molecular weight polyoxyalkyleneamine or a combination of said materials.

3. The elastomer of claim 2 wherein said at least one polyol of said quasi-prepolymer and said amine terminated polyoxyalkylene polyol of component (B) comprise polyether polyols or polyester polyols having an equivalent weight of at least about 500.

4. The elastomer of claim 3 wherein said polyester polyols are polyesters of hydroxyl terminated rubbers.

5. The elastomer of claim 3 wherein said polyether polyols are selected from the group consisting of polyols based on trihydric initiators having a molecular weight of at least about 4000; amine terminated polyether polyols having an average molecular weight greater than 1500, a functionality of from about 2 to about 6 and an amine equivalent weight of from about 750 to about 4000; and mixtures thereof.

6. The elastomer of claim 5 wherein the functionality of said polyether polyols is from about 2 to about 3.

7. The elastomer of claim 3 wherein said polyether polyols are derived from amine terminated polyether resins having greater than 50 percent of their active hydrogens in the form of amine hydrogens.

8. The elastomer of claim 3 wherein said amine terminated polyoxyalkylene polyol of component (B) is selected from diols, triols or blends thereof.

9. The elastomer of claim 1 wherein said di(methylthio)-toluene diamine comprises a 4:1 blend of 3,5-di(-methylthio)-2,4-toluene diamine and 3,5-di(methylthio)-2,6-toluene diamine, respectively.

10. The elastomer of claim 1 wherein said chain extender comprises from about 20 to 25 parts of di(methylthio)-toluene diamine to about 80 to about 75 parts of diethyltoluene diamine.

11. The elastomer of claim 1 wherein the volumetric ratio of the (A) component to the (B) component is from about 30 to about 70 percent of the (A) component to about 70 to about 30 percent of the (B) component.

12. A sprayable polyurea elastomer comprising an (A) component which includes a quasi-prepolymer of an isocyanate and a material selected from at least one polyol, a high molecular weight polyoxyalkyleneamine or a combination of said materials; and a (B) component which includes (1) an amine terminated polyoxyalkylene polyol and (2) a chain extender including a blend of di(methylthio)-toluene diamine and diethyltoluene diamine, said chain extender including between 71 and about 80 wt.% diethyltoluene diamine based upon the total weight of said chain extender.

13. The elastomer of claim 12 wherein said di(methylthio)-toluene diamine comprises a 4:1 blend of 3,5-di(-methylthio)-2,4-toluene diamine and 3,5-di(methylthio)-2,6-toluene diamine, respectively.

14. The elastomer of claim 12 wherein said chain extender comprises from about 20 to about 25 parts of di(methylthio)-toluene diamine to about 80 to about 75 parts of diethyltoluene diamine.

15. A method for improving the flowability of a sprayable polyurea elastomer, thereby permitting said elastomer to be sprayed, said method comprising incorporating a chain extender including a blend of di(methylthio)-toluene diamine and diethyltoluene diamine into said elastomer, said di(methylthio)-toluene diamine being present in an amount sufficient to reduce the rate at which said elastomer will gel thereby improving the flowability of said elastomer, and said diethyltoluene diamine being present in an amount between 71 and about 80 wt.% based upon the total weight of said chain extender; directing a first and second reactive stream into mutual contact with each other to effectuate a mixing of said first and second reactive streams, said first reactive stream including an isocyanate and said second reactive stream including an amine terminated polyoxyalkylene polyol and said chain extender; and spraying said mixed first and second reactive streams onto a substrate.

16. The method of claim 15 wherein said di(methylthio)-toluene diamine comprises a 4:1 blend of 3,5-di(methylthio)-2,4-toluene diamine and 3,5-di(methylthio-2,6-toluene diamine, respectively.

17. The method of claim 15 wherein said chain extender comprises from about 20 to about 25 parts of di(methylthio)-toluene diamine to about 80 to about 75 parts of diethyltoluene diamine.

* * * * *